(12) United States Patent
Marie et al.

(10) Patent No.: US 10,255,999 B2
(45) Date of Patent: Apr. 9, 2019

(54) SYSTEM FOR REMOVING THE RESIDUAL POWER OF A PRESSURISED WATER NUCLEAR REACTOR

(71) Applicant: SOCIETE TECHNIQUE POUR L'ENERGIE ATOMIQUE TECHNICATOME, Villiers le Bacle (FR)

(72) Inventors: Christian Marie, Massy (FR); Olivier Coste, Aix en Provence (FR); Fabrice Martin, Marseilles (FR)

(73) Assignee: SOCIETE TECHNIQUE POUR L'ENERGIE ATOMIQUE TECHNICATOME, Villiers le Bacle (FR)

( * ) Notice: Subject to any disclaimer, the term of this patent is extended or adjusted under 35 U.S.C. 154(b) by 1144 days.

(21) Appl. No.: 14/372,648

(22) PCT Filed: Jan. 17, 2013

(86) PCT No.: PCT/EP2013/050781
§ 371 (c)(1),
(2) Date: Jul. 16, 2014

(87) PCT Pub. No.: WO2013/107790
PCT Pub. Date: Jul. 25, 2013

(65) Prior Publication Data
US 2014/0362968 A1    Dec. 11, 2014

(30) Foreign Application Priority Data
Jan. 18, 2012 (FR) ..................... 12 50514

(51) Int. Cl.
*G21C 15/18* (2006.01)
*G21C 1/32* (2006.01)
*G21C 15/26* (2006.01)

(52) U.S. Cl.
CPC ............ *G21C 15/18* (2013.01); *G21C 1/322* (2013.01); *G21C 15/26* (2013.01); *Y02E 30/40* (2013.01)

(58) Field of Classification Search
CPC ....................................... G21C 15/18
See application file for complete search history.

(56) References Cited

U.S. PATENT DOCUMENTS 5,414,743 A * 5/1995 Batheja ............... G21C 15/18
376/277
5,428,652 A * 6/1995 Conrads ............... G21C 15/18
376/299

(Continued)

FOREIGN PATENT DOCUMENTS

GB    1 336 716    11/1973

OTHER PUBLICATIONS

International Search Report issued for International Application No. PCT/EP2013/050781, dated Apr. 2, 2013.

*Primary Examiner* — Lily C Garner
(74) *Attorney, Agent, or Firm* — Pillsbury Winthrop Shaw Pittman LLP

(57) ABSTRACT

A system for removing the residual power of a pressurized water nuclear reactor, includes a reserve of water, a steam generator, wherein the primary water heated by the core either circulates in a forced manner during power operation, or circulates naturally when the primary pump is stopped, and a condenser housed in the containment vessel. The condenser includes a recovery unit for recovering the condensed water and a condenser link to ensure the circulation of water in a closed circuit between the reserve and the condenser. The system further includes a device for circulating the secondary water between the steam generator and the condenser, the device being activated without an external supply of electrical energy, when an operating parameter (Continued)

Figure 1:
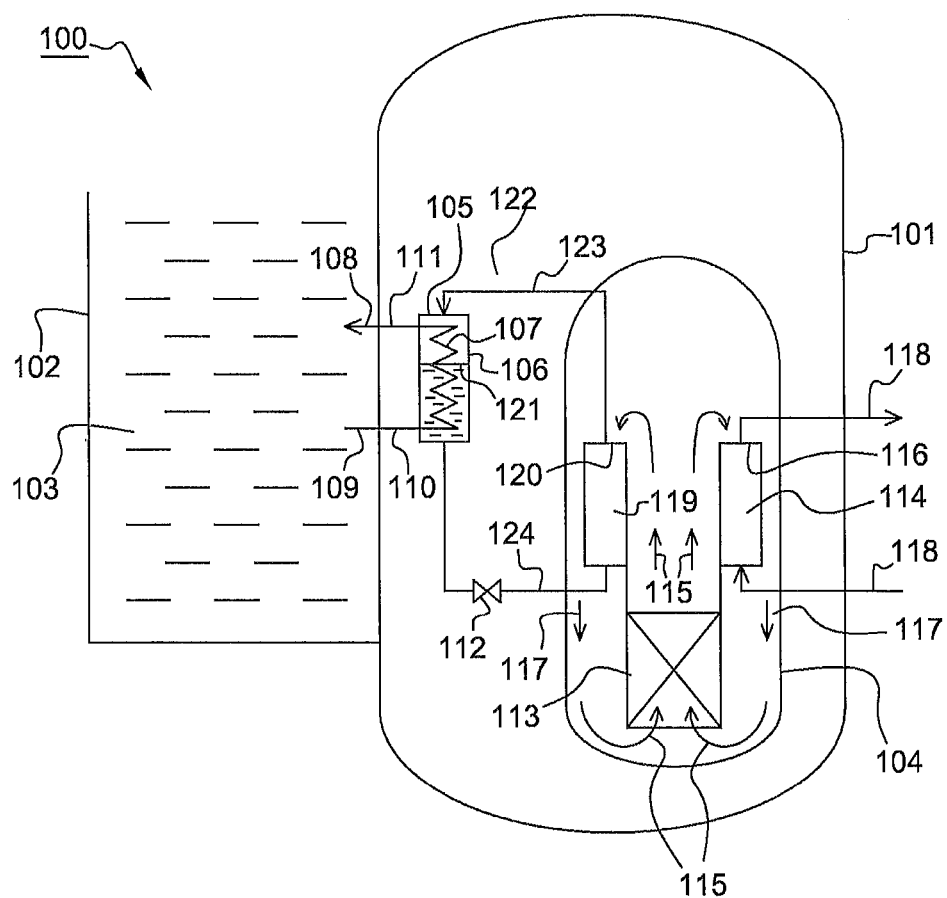

characteristic of excessive heating of the primary water reaches a certain threshold, such that the primary water heated by the core and circulating in the steam generator vaporizes the secondary water.

15 Claims, 2 Drawing Sheets

(56) References Cited

U.S. PATENT DOCUMENTS

| | | | |
|---|---|---|---|
| 5,727,618 A * | 3/1998 | Mundinger | F28F 3/086 165/185 |
| 6,795,518 B1 | 9/2004 | Conway et al. | |
| 2004/0196948 A1 * | 10/2004 | Conway | G21C 1/32 376/283 |
| 2011/0222642 A1 * | 9/2011 | Gautier | G21C 1/02 376/395 |
| 2012/0243651 A1 * | 9/2012 | Malloy | G21C 15/18 376/282 |

* cited by examiner

SYSTEM FOR REMOVING THE RESIDUAL POWER OF A PRESSURISED WATER NUCLEAR REACTOR

CROSS REFERENCE TO RELATED APPLICATIONS

This application is the U.S. National Stage of PCT/EP2013/050781, filed Jan. 17, 2013, which in turn claims priority to French Patent Application No. 1250514 filed Jan. 18, 2012, the entire contents of all applications are incorporated herein by reference in their entireties.

The present invention relates to the field of pressurised water nuclear reactors and relates more specifically to the removing of residual power from the core of this reactor after shut-down of the latter.

In general when a reactor is shut down by introducing high levels of negative reactivity into the core, the number of fissions in the latter very quickly becomes negligible at the end of a time interval of the order of a few seconds. On the other hand, the radioactivity of the fission products that are developed in the core during the period of normal operation continues to release significant power, which at the time that it is shut down can represent 6-7% of the operational power of the reactor.

At the end of a few hours after shut-down, the residual power still represents 1-2% of the operational power of the reactor, with the decrease subsequently being relatively slow: such residual power must be removed. It is therefore necessary to have the means to remove this residual power in any situation, on pain of risking core meltdown. In order to achieve this, the use of core residual power removing devices is known for accident situations which are specific, as opposed to the means used during a normal shut-down.

The removing of residual power from the cores of nuclear reactors in the event of an accident is conventionally achieved by back-up systems which use active means, the principle behind which involves for example cooling the primary fluid with steam removing arranged on the secondary, with water being re-supplied to the steam generator by active means (pumps).

Such safety cooling systems using active means of the pump type require a supply of external energy, in particular in order to make the pumps run. Since the reactor is in shut-down it is no longer producing electricity and it is therefore necessary to call upon backup power sources (for example diesel generators) to enable the pumps to operate. It is readily understood therefore that the nature of these active sources reduces the reliability of the cooling function.

In the context of a total loss of electricity supply, fully passive devices are also known for removing residual power.

Thus document U.S. Pat. No. 6,795,518 describes the characteristics of an integrated pressurised water reactor (i.e. where the steam generator is within the reactor primary containment) comprising a passive device for removing residual power which uses the steam from the secondary side of the reactor primary containment steam generator. The steam from the steam generator condenses on the tubes of a condenser through cooling with the water contained in an inertial capacity; the water from the inertial capacity circulates naturally as does the steam which circulates naturally between the GV steam generator and the external condenser. The system is triggered passively by a valve which opens without any supply of external energy.

Such an architecture nevertheless poses certain problems.

The passive system for removing residual power according to document U.S. Pat. No. 6,795,518 uses the steam from the steam generator used to supply the turbine. Thus this system will not operate in the event of a breach of secondary water in the steam generator.

In addition, the use of isolation valves allowing the containment vessel condenser to be isolated in order to prevent any risk of radioactivity being dispersed outside the containment should be noted. It will be recalled that the containment vessel houses the main equipment of the nuclear steam system, protects it from external accidents (earthquakes, projectiles, flooding etc.) and forms the third barrier preventing radioactive products from being released into the environment, after the fuel cladding and the reactor primary containment. If a breach occurs in the links connecting the containment vessel and the condenser, closure of the isolation valves should be activated to prevent secondary water spilling out of the containment vessel (in particular into the inertial capacity). Such a closure results, in de facto non-operation of the residual power removing system. Similarly, in the absence of any electricity supply, the isolation valves are closed by default (so as to ensure that the containment is isolated): once the valves are closed, the residual power removing system can no longer operate.

Moreover, the fact that the steam generator used is that used during power operation of the reactor means that it undergoes ageing and wear.

Models of SCOR-type ("Simple Compact Reactor") integrated pressurised water reactors are also known which comprise a single steam generator incorporated into the reactor primary containment. These reactors moreover comprise a passive residual power removing device which includes multiple heat exchangers incorporated into the reactor primary containment. In the event of residual power removing, the primary water is cooled through contact with the residual power removing heat exchangers wherein cooling water is circulating. This secondary water will itself exchange its heat with a condenser outside the containment vessel, in contact with water coming from an inertial capacity.

Such an architecture also poses certain problems.

As with document U.S. Pat. No. 6,795,518, the SCOR reactor involves the use of closing isolation valves (i.e. which prevent the fluid circulating) in the event of loss of electricity supply.

Moreover, removing of residual power is achieved by using a heat exchanger which exhibits a removal efficiency which is less than that of a steam generator.

Finally, the SCOR reactor is designed such that it is not possible to test the residual power removing system during normal power operation of the reactor: the architecture is, in effect, such that the primary water does not enter the heat exchanger during power operation of the reactor.

In this context, the purpose of the present invention is to offer a passive system of removing residual power from the core of a pressurised water nuclear reactor, as well as the reactor incorporating said system, including in the event of a breach of secondary water in the steam generator supplying the turbine, said system comprising no isolation valves between the containment vessel and the condenser and being capable of being tested during power operation of the reactor.

To this end the invention proposes a system for removing the residual pressure of a pressurised water nuclear reactor comprising a containment vessel which incorporates a reactor primary containment which includes the core of said reactor, said system comprising:

a reserve of water;
at least one steam generator, called the dedicated module, suitable to be housed in the reactor primary containment and designed to make secondary water enter the vapour phase on thermal contact with the primary water, wherein the primary water heated by the core, circulates either in a forced manner by means of at least one primary pump during reactor power operation, or circulates naturally in situations where the primary pump is stopped, the primary water heated by the core circulating without secondary circulation of water in the dedicated module during reactor power operation;
at least one condenser suitable to be housed in the containment vessel which includes:
  a recovery unit designed to recover water condensed by the condenser;
  a link, called the condenser link, designed to ensure the circulation of water in a closed circuit between the reserve and the condenser;
means of circulating the secondary water between the dedicated module and the condenser, said means being activated without an external supply of electrical energy, when an operating parameter characteristic of excessive heating of the primary water reaches a certain threshold, such that the primary water heated by the core and circulating in the dedicated module vaporises the secondary water circulating in the module by giving up heat to it;
a hot link ensuring the natural circulation of the steam from the dedicated module to the condenser, the condenser being designed to condense the steam circulating in the hot link by means of thermal contact with the water circulating naturally in the condenser link;
a cold link ensuring the circulation under gravity of the water from the recovery unit to the secondary water inlet of the dedicated module.

Another object of the invention is a pressurised water nuclear reactor comprising:
  a containment vessel incorporating a reactor primary containment which includes the core of said reactor, said reactor primary containment comprising:
    a primary circulation circuit for pressurised primary water to remove the power provided by the core during reactor power operation;
    at least one steam generator, called the power operation generator, wherein the primary water heated by the core and circulating in the power operation generator gives up heat to the secondary water circulating in the power operation generator in order to vaporise this secondary water during reactor power operation.
  a system to ensure the removing of residual power from said reactor, comprising:
    a reserve of water;
    at least one steam generator, called the dedicated module, which differs from the power operation generator, housed in the reactor primary containment and wherein circulates primary water heated by the core which gives up heat to the secondary water in order to vaporise this secondary water when it circulates in the dedicated module;
    at least one condenser housed in the containment vessel which includes:
      a recovery unit for recovering water condensed by the condenser;
      a heat exchanger housed inside the recovery unit;
      a link, called the condenser link, connecting the reserve and the heat exchanger in a closed circuit;
      a hot link connecting the steam outlet of the dedicated module with the condenser such that the condenser condenses the steam circulating in the hot link by means of thermal contact with the water circulating in the condenser link;
      a cold link connecting the recovery unit with the secondary water unit of the dedicated module;
      an automatically activated opening/closing valve with no external electrical energy supply, said valve being arranged such that no secondary water circulates in the dedicated module when said valve is closed and such that water from the recovery unit circulates in the dedicated module when said valve is open, said valve opening when an operating parameter characteristic of excessive heating of the primary water reaches a certain threshold.

The system for removing the residual power and the pressurised water nuclear reactor according to the invention can also exhibit one or more of the characteristics below, considered individually or according to all technically possible combinations:
  said dedicated module is a once-through steam generator;
  said dedicated module is a counter-flow steam generator;
  said condenser is arranged at a height which is greater than that of said dedicated module in order to allow natural circulation; said dedicated module is micro-channel heat exchanger formed from an assembly of etched plates;
  the power operation generator and the dedicated module have identical structures; this last characteristic means that the two distinct steam generators (GVs) have identical structures (both in terms of geometric shape and in terms of the materials used);
  said condenser is housed near the side walls of the containment vessel;
  the water reserve is arranged on the side of or above the containment vessel;
  the dedicated module is arranged in the reactor primary containment above the core of the reactor so as to allow natural circulation;
  the core is in the lower central part of the reactor primary containment and the dedicated module is arranged near the side wall of said reactor primary containment.

Another subject of the invention is a pressurised water nuclear reactor comprising:
  a containment vessel incorporating a reactor primary containment which includes the core of said reactor;
  a system to ensure removing of residual power according to the invention;
  said reactor primary containment comprising:
    a primary circulation circuit for pressurised primary water to remove the power provided by the core during reactor power operation;
    at least one steam generator, called the power operation generator, which is different from the dedicated module and wherein the primary water heated by the core and circulating in the power operation generator gives up heat to secondary water circulating in the power operation generator in order to vaporise this secondary water during reactor power operation.

Figure 2A:
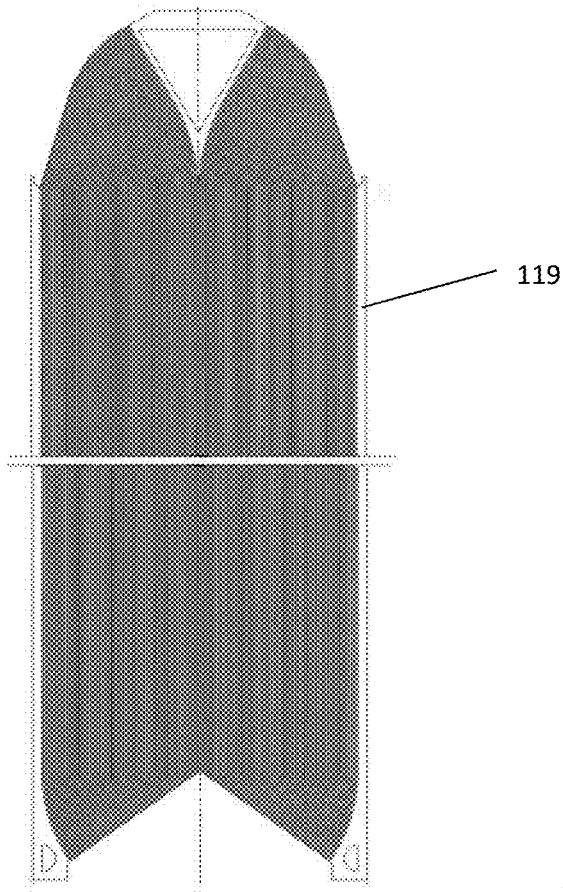
Figure 2B:
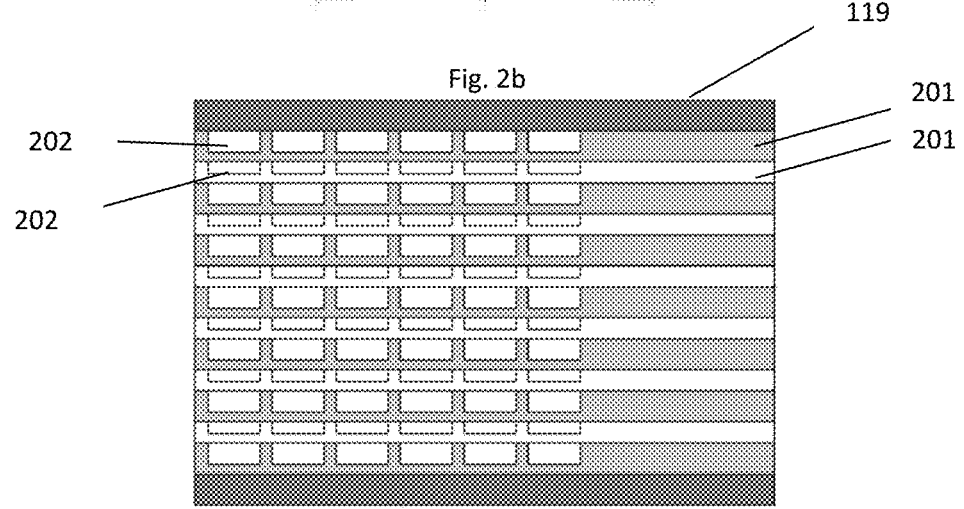

Other characteristics and advantages of the invention will emerge clearly from the description of it that is given below by way of an indication and which is in no way restrictive, with reference to the appended figures:

FIG. 1 schematically shows a nuclear reactor according to the invention,

FIG. 2a schematically shows an example of a microchannel heat exchanger (seen vertically) formed from an assembly of etched plates, and FIG. 2b shows a horizontal cross-section of the microchannel heat exchanger of FIG. 2a formed from an assembly of etched plates.

The reactor 100 comprises two principal elements:
a containment vessel 101;
a reserve of water 102.

The reserve of water 102 is shown here on the side of the containment vessel 101 but it is to be understood that it may be placed all around the containment vessel 101 or above it. This reserve of light water 102 must comprise a large volume of water 103. This volume is all the greater because the aim is to delay any human action. As an order or magnitude, the volume of water above the outlet of line 108 is a few hundred m3 for 72 hours operation; for example, and non-restrictively, this volume is less than 1000 m$^3$ for a 300 MWth reactor.

The water in the reserve of water 102 may be light water treated to ensure its quality in the long term, without this excluding the use of untreated water in accident situations, such that the reserve of water may be filled when it is emptied; to this end dry ducts (not shown) may be provided to allow remote filling. It should be noted that the reserve of water 102 is not pressurised, such that the water in this reserve 102 at the highest level is substantially at atmospheric pressure.

The containment vessel 101 comprises:
a reactor primary containment 104;
at least one condenser 105;

As stated previously, the containment vessel houses the main equipment of the nuclear steam system, protects it from external accidents (earthquakes, projectiles, flooding etc.) and forms the third barrier preventing radioactive products from being released into the environment.

The condenser 105 is formed of a recovery unit 106 (i.e. a receptacle designed to receive the water condensed by the condenser) and a heat exchanger 107 housed inside the recovery unit 106, and whose ends 108 and 109 enter the reserve of water 102, with end 108 being located above end 109. The ends 109 and 108 are respectively connected to the condenser heat exchanger 107 via two pipes 110 and 111. In normal power operation of the reactor 100, the recovery unit 106 is full of water (i.e. up to the level 121 shown in FIG. 1). This water may be in the form of steam, liquid or two-phase.

The reactor primary containment 104 forms the pressure containment vessel of the nuclear reactor 100; according to one preferential embodiment of the invention, the nuclear reactor 100 is an integrated or compact-type nuclear reactor such that the reactor primary containment 104 comprises, in a known manner:
the reactor core 113, formed of nuclear fuel assemblies and housed at the bottom in the middle of the reactor primary containment 104;
at least one steam generator 114 placed above the core 113 on the periphery of the primary containment 104.

In normal operation of the reactor 100 (i.e. when the reactor is in power operation in order to produce steam), a primary water circulation called the "primary system" is arranged inside the primary containment 104 to remove the heat from the central core to the steam generator 114. There is therefore a central upwards movement (arrows 115) of the fluid which passes in succession into the core 113, then enters the steam generator 114 via a primary inlet 116 located on the upper part of the steam generator 114, the fluid then being sent back into the primary containment 104 at its periphery, to fall back once more below the central core in a downwards peripheral movement (arrows 117).

Primary circulation pumps which are not shown are installed (in or around the primary containment 104) to supply the necessary energy to the primary water, in order to ensure that it circulates within the primary containment 104 assembly.

A secondary circuit 118 connects the steam generator 114 allowing the steam to be supplied for the user (this steam being likely, in particular, to supply a turbine for the production of electricity). More specifically, in the steam generator 114, this heat transforms the secondary water into steam. The steam is then returned to the liquid state in a condenser and returns to the steam generator 114 by being made to circulate by means of secondary pumps in the secondary circuit 118.

In accordance with the invention, the reactor primary containment 104 comprises moreover another steam generator 119, called the dedicated steam generator (GV) module, also housed at the periphery of the reactor primary containment 104, in its upper part, above the core 113.

This dedicated GV module 119 has the specific feature of being dedicated to the removing of residual power: in other terms, the GV module 119 plays no part in the turbine steam supply. During normal reactor power operation, the primary water heated by the core 113 follows its upwards movement (arrows 115) then enters the GV module 119 via a primary inlet 120 located on the upper part of the GV module 119, the fluid then being sent back into the primary containment 104 at its periphery to fall once more below the central core in a downwards peripheral movement (arrows 117).

Unlike steam generator 114, there is no secondary system connecting the GV module 119 to the turbine. There is, on the other hand, a secondary system 122 wherein water located in the recovery unit 106 can circulate.

This secondary system 122 comprises:
a passive opening/closure valve 112.
a hot leg 123;
a cold leg 124.

The passive opening/closure valve 112 is closed during normal reactor operation and only opens passively when a given parameter exceeds a predetermined threshold value. This parameter may be the pressure in the dedicated GV 119 or the primary coolant temperature, for example. The term passive opening should be taken to mean an opening without a supply of electrical energy. A more precise system equipped with a stand-alone battery can also be envisaged.

It will be remarked that the recovery unit 106 of the condenser 105 is located above (i.e. higher than) the GV module 119, such that when the valve 112 is opened, the water from the recovery unit falls under gravity through the cold leg 124 into the GV module 119.

During reactor power operation, the valve 112 is closed such that no secondary water circulates in the GV module 119; thus during power operation the primary water heated by the core 115 passes through the GV module 119 without exchanging heat with the secondary water which is not circulating.

The GV module 119 is preferably a once-through steam generator. The term once-through steam generator should be taken to mean a steam generator wherein the secondary water (when it is circulating in the generator) passes through the generator in one go; in other words, all the secondary water (in the form of steam and/or liquid) enters and leaves the generator in one go without the possibility of being able to re-circulate into the steam generator; this type of once-through generator is in contrast, for example, to generators constituted of a bundle of U-shaped tubes surrounded by a cylindrical envelope which comprises separation cyclones: in the case of a multi-pass (recirculating) steam generator, part of the secondary water located between the envelopes and the tubes is vaporised, whilst the other non-vaporised part returns into the annular space of the envelope. This type of multi-pass steam generator offers the huge drawback of having very large dimensions and therefore being not particularly suitable for use as a generator dedicated solely to removing residual power.

The once-through GV module 119 is preferably a counter-flow steam generator; the term counter-flow steam generator should be taken to mean a generator in which the primary and secondary water currents are currents which are circulating in opposite directions. We will return subsequently to the benefits of having a counter-flow steam generator.

To summarise, in normal power operation primary water circulates in the primary containment 104, this primary water is heated by thermal exchange with the core 113 of the reactor. The heated water is cooled by thermal exchange with the steam generator 114, the steam produced in the steam generator 114 being intended for the user.

In the event of the normal core cooling system (not detailed here) not being available, for example due to loss of electricity supply, then shut-down of the reaction is initiated by the control rods dropping, introducing a high level of negative reactivity into the core, and the residual power is removed according to the present invention.

The increase in the core temperature will result in the passive opening valve 112 being opened: this valve may be operated by the effect of increase in pressure in the dedicated GV, itself in correlation with the increase in the primary temperature, or directly by the primary temperature. In all cases this valve opens in a passive manner once a parameter (temperature or pressure, for example) exceeds a determined threshold value which is representative of a need to remove the residual power. By way of an illustration, for a nominal mean primary temperature of 280° C., the opening of the valve may occur at towards 290° C. It should be noted that given the harmless effect of unwanted opening of this valve, this margin could be reduced if need be.

The primary water heated by the core continues to circulate along the arrows 115 in the primary containment 104 by natural circulation. The secondary water coming from the recovery unit 106 and which circulates in the cold leg 124 enters the GV module 119 and evaporates in contact with the primary water heated by the core. The secondary steam then rises into the hot leg 123. The steam from the GV module 119 condenses in contact with the condenser heat exchanger 107 by thermal contact with the water coming from the reserve of water 103 via a pipe 110; the condensed steam is recovered in the recovery unit 106 and is then re-injected into the GV module 119.

It should be noted that the level of water 103 in the water reserve 102 is above the bottom link pipe 110 between the condenser heat exchanger 107 and the reserve of water 102.

The steam being at a high temperature (dependant on the primary temperature itself, initially at 300° C., as an order of magnitude), it will trigger partial boiling of the water coming from the reserve 102 and which is circulating in the condenser heat exchanger 107. This boiling allows operation, through circulation by natural convection, of the loop (successively formed by the pipe 110, the condenser heat-exchanger 107 and the pipe 111) wherein the two-phase water from the reserve of water 102 circulates.

The system for removing of the residual power therefore operates using three natural circulation loops: a primary loop wherein the primary water circulates through the core and the primary side of GV module 119, a secondary loop wherein the secondary water circulates through the secondary side of the GV module 119 and the condenser 105, and a tertiary loop, wherein the water of the reserve 102 circulates.

When the level of the reserve of water 102 falls below the height of the condenser 105, there is no longer any water to supply the condenser 105 under gravity; this situation should be avoided by filling the reserve 102 sufficiently so that its level of water 102 always remains above the condenser 105.

It should be noted that the primary water circulates through the GV module 119 irrespective of the operating mode of the reactor (in power operation, and after shut-down of the reactor in order to remove the residual power). Thus the system for removing the residual power according to the invention can be tested, including in reactor power operation. All that is required for this is to force the opening of valve 112. This test procedure is made possible since the GV module 119 is never short-circuited during the circulation of primary water.

As has been stated above, the CV module 119 is preferentially a counter-flow steam generator. By using counter-currents the steam is superheated at the outlet from the GV module since the primary and secondary coolant fluids cross at their maximum temperatures. Such an arrangement enables the exchange efficiency of the system to be improved.

The condenser 105 is preferentially placed as near as possible to the wall of the containment vessel so as to minimise the risk of breaches in pipes 110 and 111 caused by external attack.

The distance between the condenser 105 and the wall of the containment vessel may be, for example, of the order of 1 meter or even less than 1 meter.

Moreover, the diameters of these pipes 110 and 11 are to be chosen such that the flow is sufficient to remove the residual power and to favour priming and maintenance of the natural circulation, taking the foreseeable differences in level into consideration.

In order to ensure that GV module 119 can be arranged within the primary containment of the reactor 104, designed to achieve reduced dimensions, the GV module 119 (see FIG. 2a) may advantageously be made in the form of a micro-channel heat exchanger. This micro-channel heat exchanger is made, for example, using etched plates 201 (see FIG. 2b) which are diffusion-welded together. The etched plates 201 have channels 202. The advantage of such a structure is its compactness, particularly when compared with tube heat exchangers. An example of a micro-channel heat exchanger formed from an assembly of etched plates is shown in FIGS. 2a-b. The steam generator 114 whose structure may be identical to that of GV module 119 may therefore also be a micro-channel heat exchanger.

To summarise the advantages of the invention, the proposed solution is based on closed loop cooling using natural circulation between a once-through and counter-flow GV module dedicated to the function of removing the residual power (and located within the reactor primary containment) and a condenser which is outside the steam system block and located within the containment vessel. This condenser is itself cooled using natural circulation of a large volume of water (lateral pond, for example) which is outside the containment vessel. The secondary coolant fluid remains confined between the Steam Generator (GV) module and the condenser. The removing of residual power function is achieved in a passive manner. This safety system is triggered using a passive automatic device (i.e. without human intervention) with no external supply of energy. Having a condenser inside the containment vessel means that in the event of a link inside the primary containment of the dedicated GV module breaking, there is no risk of sending primary water out of the containment vessel, and that there is no need to use isolation valves which could render the system unavailable. Moreover, a failure (highly unlikely, being cold) of the link between the condenser and the reserve of water does not result in any steam system transient condition.

According to one embodiment of the invention, the steam generator 114 has a structure which is identical to that of GV module 119.

The invention is of course not limited to the embodiment which has just been described.

Thus, even though a single condenser has been described, it is to be understood that the invention applies to the case where several condensers are found within the containment vessel, thus enabling accident situations involving a one-off failure or line maintenance situations to be handled.

Similarly the reactor according to the invention may comprise several GV modules and several steam generators.

The invention claimed is:

1. A pressurised water nuclear reactor comprising:
   a containment vessel incorporating a reactor primary containment which includes a core of said reactor, said reactor primary containment comprising a core cooling system for cooling the core during reactor power operation, comprising:
   a primary circulation circuit for pressurised primary water to remove heat provided by the core during reactor power operation;
   at least one power operation steam generator, wherein the primary water heated by the core and circulating in the power operation steam generator gives up heat to a secondary water for turbine operation circulating in the power operation steam generator in order to vaporise the secondary water for turbine operation during reactor power operation;
   a system to ensure removal of residual power from said reactor after shut-down of the reactor, comprising:
      a reserve of water;
      an automatically activated opening/closing valve moving from a closed position to an open position, an activation of the valve from the closed position to the open position being triggered by a parameter reaching a certain threshold, said parameter being characteristic of an excessive heating of the primary water representative of a need to remove the residual power in case of shut-down of the reactor;
      at least one dedicated steam generator, which is separate from the power operation steam generator, housed in the reactor primary containment and in which circulates primary water heated by the core irrespective of an operation mode of the reactor, including the shut-down of the reactor, the heated primary water giving up heat to a secondary water for removing residual power in order to vaporise said secondary water for removing residual power only when the valve is open, wherein no secondary water for removing residual power or secondary water for turbine operation circulates in the at least one dedicated steam generator when the valve is closed;
      at least one condenser housed in the containment vessel which includes:
         a recovery unit for recovering water condensed by the condenser;
         a heat exchanger housed inside the recovery unit;
         a condenser circuit, connecting the reserve of water and the heat exchanger in a closed circuit;
         a hot leg connecting a steam outlet of the at least one dedicated steam generator with the condenser such that the condenser condenses the steam circulating in the hot leg by means of thermal contact with the water circulating in the condenser circuit, and
         a cold leg connecting the recovery unit with a secondary water inlet of the at least one dedicated steam generator.

2. The pressurised water nuclear reactor according to claim 1, wherein said at least one dedicated steam generator is a once-through steam generator.

3. The pressurised water nuclear reactor according to claim 1, wherein said at least one dedicated steam generator is a counter-flow type steam generator.

4. The pressurised water nuclear reactor according to claim 1, wherein said condenser is arranged at a height which is greater than that of said at least one dedicated steam generator in order to allow natural circulation.

5. The pressurised water nuclear reactor according to claim 1, wherein said at least one dedicated steam generator is a micro-channel heat exchanger formed from an assembly of etched plates.

6. The pressurised water nuclear reactor according to claim 1, wherein the power operation steam generator and the at least one dedicated steam generator have an identical structure.

7. The pressurised water nuclear reactor according to claim 1, wherein said condenser is housed in a peripheral part of the containment vessel.

8. The pressurised water nuclear reactor according to claim 1, wherein the reserve of water is arranged on the side of or above the containment vessel.

9. The pressurised water nuclear reactor according to claim 1, wherein said at least one dedicated steam generator is arranged within the reactor primary containment above the core of the reactor so as to allow natural circulation.

10. The pressurised water nuclear reactor according to claim 9, wherein the core is in a lower central part of the reactor primary containment and the at least one dedicated steam generator is arranged in a peripheral part of said reactor primary containment.

11. The pressurised water nuclear reactor according to claim 7, wherein a distance between the condenser and a lateral wall of the containment vessel is less than or equal to 1 m.

12. The pressurised water nuclear reactor according to claim 1, wherein the condenser is located outside of the reactor primary containment.

13. The pressurised water nuclear reactor according to claim 1, wherein, during reactor power operation, said valve is closed such that only the primary water circulates through the at least one dedicated steam generator and the primary water and the secondary water for turbine operation circulate in the at least one power operation steam generator.

14. The pressurised water nuclear reactor according to claim 1, wherein the parameter is a pressure in the at least one dedicated steam generator.

15. The pressurised water nuclear reactor according to claim 1, wherein the parameter is a temperature of the primary water.

* * * * *